United States Patent
Kupratis et al.

(10) Patent No.: US 10,393,067 B2
(45) Date of Patent: Aug. 27, 2019

(54) GAS TURBINE ENGINE WITH COLD TURBINE AND MULTIPLE CORE FLOWPATHS

(71) Applicant: United Technologies Corporation, Farmington, CT (US)

(72) Inventors: Daniel Bernard Kupratis, Wallingford, CT (US); Francis R. Moon, Granby, CT (US); Arthur W. Utay, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 322 days.

(21) Appl. No.: 15/246,689

(22) Filed: Aug. 25, 2016

(65) Prior Publication Data

US 2018/0058376 A1    Mar. 1, 2018

(51) Int. Cl.

| F02K 3/077 | (2006.01) |
|---|---|
| F02K 3/02 | (2006.01) |
| F02K 3/06 | (2006.01) |
| F02C 3/04 | (2006.01) |
| F02K 3/075 | (2006.01) |
| F02C 3/10 | (2006.01) |

(52) U.S. Cl.
CPC .................. *F02K 3/06* (2013.01); *F02C 3/04* (2013.01); *F02C 3/10* (2013.01); *F02K 3/075* (2013.01); *F02K 3/077* (2013.01); *F05D 2210/12* (2013.01); *F05D 2220/36* (2013.01)

(58) Field of Classification Search
CPC . F02K 3/06; F02K 3/077; F02K 3/075; F02K 3/00; F02K 3/02; F02K 3/025; F02K 3/04; F02C 3/10; F05D 2220/36
See application file for complete search history.

(56) References Cited

U.S. PATENT DOCUMENTS

| 5,305,600 A | 4/1994 | Brossier et al. |
| 8,935,923 B2 | 1/2015 | Kupratis |
| 9,057,328 B2 | 6/2015 | Kupratis |
| 9,140,188 B2 | 9/2015 | Kupratis |
| 9,157,366 B2 | 10/2015 | Kupratis |
| 9,239,002 B2 | 1/2016 | Reisser |
| 9,341,121 B2 | 5/2016 | Kupratis |
| 9,523,329 B2 * | 12/2016 | Kupratis ................. F02K 3/075 |
| 2011/0056208 A1 * | 3/2011 | Norris ..................... F02C 3/107 |
| | | 60/772 |
| 2013/0025286 A1 * | 1/2013 | Kupratis ................. F02K 3/065 |
| | | 60/772 |
| 2013/0104521 A1 * | 5/2013 | Kupratis ................... F02C 9/52 |
| | | 60/204 |
| 2013/0104524 A1 * | 5/2013 | Kupratis ................... F02K 3/04 |
| | | 60/226.1 |

(Continued)

OTHER PUBLICATIONS

Extended EP Search Report for EP Patent Appln. No. 17187812.7 dated Jan. 18, 2018.

*Primary Examiner* — William H Rodriguez
(74) *Attorney, Agent, or Firm* — O'Shea Getz P.C.

(57) ABSTRACT

A gas turbine engine includes a spool configured to rotate about an axial centerline. The spool includes a fan rotor and a cold turbine rotor. The fan rotor is rotatably driven by the cold turbine rotor. A cold turbine inlet passage is configured to direct an airflow along a radial inward trajectory to the cold turbine rotor.

12 Claims, 6 Drawing Sheets

(56) References Cited

U.S. PATENT DOCUMENTS

| | | | |
|---|---|---|---|
| 2013/0145769 A1* | 6/2013 | Norris | F02K 3/105 60/772 |
| 2013/0255224 A1 | 10/2013 | Kupratis et al. | |
| 2013/0343867 A1* | 12/2013 | Moon | F02K 3/025 415/1 |
| 2014/0260180 A1* | 9/2014 | Kupratis | F02K 3/075 60/204 |
| 2015/0121893 A1* | 5/2015 | Kupratis | F02C 7/36 60/774 |
| 2015/0252732 A1* | 9/2015 | Kupratis | F02C 9/18 60/226.3 |
| 2015/0377125 A1* | 12/2015 | Kupratis | F02K 3/06 60/774 |
| 2016/0237895 A1* | 8/2016 | Kupratis | F01D 5/02 |
| 2018/0023482 A1* | 1/2018 | Lefebvre | F02C 3/113 415/68 |
| 2018/0023576 A1* | 1/2018 | Kupratis | F04D 17/105 415/144 |

* cited by examiner

GAS TURBINE ENGINE WITH COLD TURBINE AND MULTIPLE CORE FLOWPATHS

BACKGROUND OF THE INVENTION

1. Technical Field

This disclosure relates generally to a gas turbine engine and, more particularly, to a gas turbine engine with multiple core flowpaths.

2. Background Information

Various types and configurations of gas turbine engines are known in the art. While these known gas turbine engines have various benefits, there is still room in the art for improvement.

SUMMARY OF THE DISCLOSURE

According to an aspect of the present disclosure, a gas turbine engine is provided that includes a spool and a cold turbine inlet passage. The spool is configured to rotate about an axial centerline. The spool includes a fan rotor and a cold turbine rotor. The fan rotor is rotatably driven by the cold turbine rotor. The cold turbine inlet passage is configured to direct an airflow along a radial inward trajectory to the cold turbine rotor.

According to another aspect of the present disclosure, another gas turbine engine is provided that includes a fan section, a first turbine section, a compressor section, a second turbine section and a combustor. The fan section includes a fan rotor. The first turbine section includes a first turbine rotor configured to drive the fan rotor. The compressor section includes a compressor rotor. The second turbine section includes a second turbine rotor configured to drive the compressor rotor. The gas turbine engine is configured with a first flowpath and a second flowpath. The first flowpath is downstream of the compressor section and extends through the first turbine section. The second flowpath is downstream of the compressor section and extends respectively through the combustor and the second turbine section.

The gas turbine engine may include a cold turbine outlet passage. The cold turbine rotor may be configured to: (a) receive the airflow from the cold turbine inlet passage along the radial inward trajectory; and (b) direct the airflow into the cold turbine outlet passage along an axial trajectory.

The gas turbine engine may include an airflow regulator configured to regulate the airflow through the cold turbine rotor.

The airflow regulator may be configured downstream of the cold turbine rotor.

The airflow regulator may include a door.

The gas turbine engine may include a second spool and a combustor. The second spool may include a compressor rotor and a hot turbine rotor. The combustor may be fluidly between the compressor rotor and the hot turbine rotor.

The gas turbine engine may include a first flowpath, a second flowpath and a manifold. The first flowpath may extend through the cold turbine rotor. The second flowpath may extend through the combustor and the hot turbine rotor. The manifold may be configured to receive a compressed airflow from the compressor rotor, to direct a portion of the compressed airflow into the first flowpath as the airflow, and to direct another portion of the compressed airflow into the second flowpath as a second airflow.

The manifold may include the cold turbine inlet passage.

The manifold may include an annular array of ports, which includes a plurality of first ports and a plurality of second ports. Each of the first ports may be located between an adjacent pair of the second ports. The first ports may be fluidly coupled with the first flowpath. The second ports may be fluidly coupled with the second flowpath.

The manifold may be formed as a monolithic body.

The manifold may be additive manufactured.

The combustor may be configured as or otherwise include a reverse flow combustor.

The hot turbine rotor may be configured to receive a second airflow along a radial inward trajectory, and to output the second airflow along an axial trajectory.

The spool may substantially only include the fan rotor, the cold turbine rotor and a shaft connecting the fan rotor and the cold turbine rotor.

The gas turbine engine may include a first spool comprising the fan rotor and the first turbine rotor. The gas turbine engine may also include a second spool comprising the compressor rotor and the second turbine rotor.

The gas turbine engine may be configured with a third flowpath that extends through the fan section and bypasses the compressor section, the first turbine section and the second turbine section.

An outlet of the first flowpath may be fluidly coupled with the third flowpath.

The cold turbine rotor may be configured to receive an airflow along a radial inward trajectory, and to output the airflow along an axial trajectory.

The gas turbine engine may include a manifold configured to receive a compressed airflow from the compressor rotor, to direct a portion of the compressed airflow into the first flowpath as a first airflow, and to direct another portion of the compressed airflow into the second flowpath as a second airflow.

The foregoing features and the operation of the invention will become more apparent in light of the following description and the accompanying drawings.

DETAILED DESCRIPTION OF THE INVENTION

Figure 1:
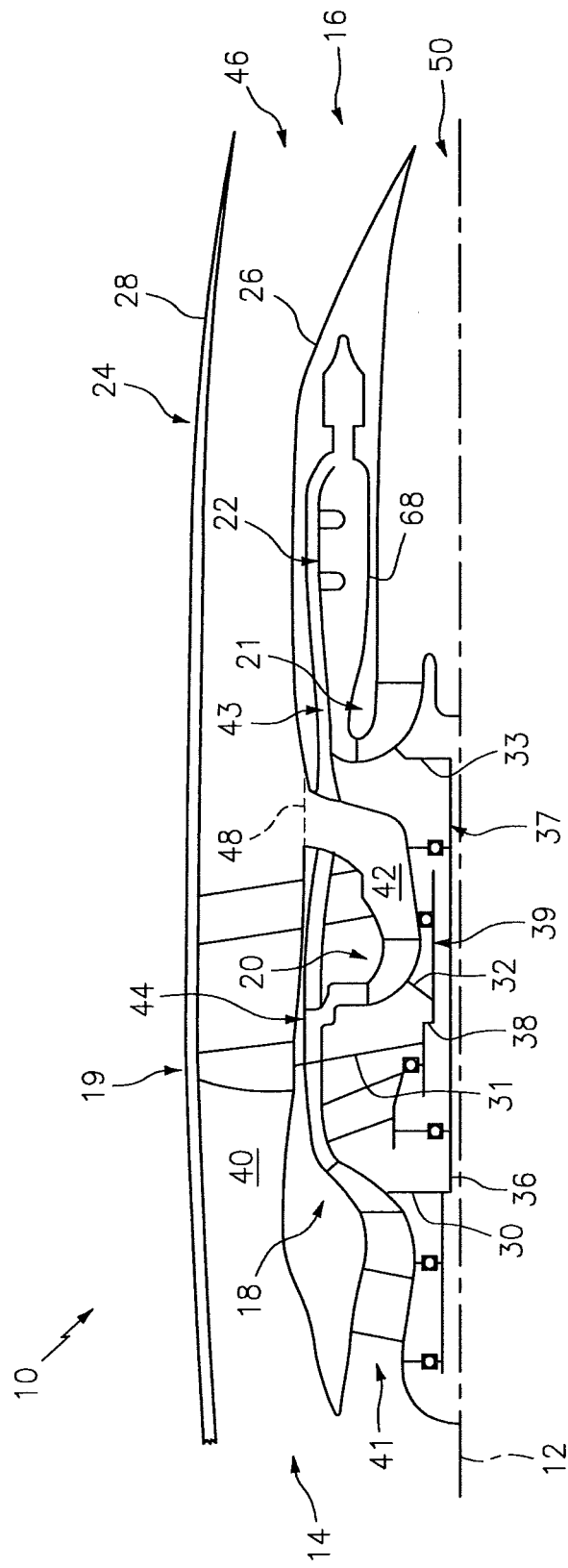
FIG. 1 is a partial side sectional schematic illustration of a multi-stream mixed turbofan gas turbine engine.

FIG. 1 is a partial side sectional schematic illustration of a multi-stream mixed turbofan gas turbine engine 10 for an aircraft propulsion system. This turbine engine 10 extends along an axial centerline 12 from a forward and upstream airflow inlet 14 to an aft and downstream airflow exhaust 16. The turbine engine 10 includes a compressor section 18, a fan section 19, a cold turbine section 20, a hot turbine section 21 and a combustor section 22.

During operation, as described below in further detail with reference to FIGS. 2 and 3, an airflow is directed through the compressor section 18 to an airflow manifold 44. The manifold 44 splits the compressed airflow and directs a portion of the split airflow through the cold turbine section 20, which thereby powers the fan section 19. The manifold 44 also directs another portion of the split airflow through the combustor section 22 and then the hot turbine section 21, which thereby powers the compressor section 18.

The engine sections 18-22 may be arranged sequentially along the centerline 12, and are arranged within an engine housing 24. This engine housing 24 includes an inner housing structure 26 and an outer housing structure 28. The inner housing structure 26 of FIG. 1 houses the compressor section 18, the cold turbine section 20, the combustor section 22 and the hot turbine section 21. The outer housing structure 28 of FIG. 1 houses the fan section 19 and circumscribes the inner housing structure 26.

The compressor section 18, the fan section 19, the cold turbine section 20 and the hot turbine section 21 each include a respective rotor 30-33. Each of these rotors 30-33 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 30 and/or the fan rotor 31 may each be configured as an axial flow rotor. Herein, the term "axial flow rotor" may describe a rotor configured to (i) receive an incoming airflow along a substantially axial (e.g., more axial than radial) trajectory and (ii) provide an outgoing (e.g., compressed) airflow along the same or a similar substantially axial trajectory. An airflow therefore may travel axially through an axial flow rotor such that an axial trajectory of the airflow is generally unaltered.

The cold turbine rotor 32 and/or the hot turbine rotor 33 may each be configured as a radial-to-axial flow rotor. Herein, the term "radial-to-axial flow rotor" may describe a rotor configured to (i) receive an incoming airflow along a substantially radial (e.g., more radial than axial) trajectory and (ii) provide an outgoing airflow along a substantially axial (e.g., more axial than radial) trajectory. A course of an airflow therefore may be diverted from a radial inward trajectory to an axial trajectory (e.g., downstream) as that airflow travels through a radial-to-axial flow rotor. With such a configuration, each of the turbine rotors 32 and 33 of FIG. 1 may be thought of as having an inverse centrifugal rotor/impeller configuration.

The compressor rotor 30 is connected to and rotatably driven by the hot turbine rotor 33 through an engine shaft 36; e.g., a high speed shaft. With this configuration, the turbine engine components 30, 33 and 36 are included in and form an engine spool 37; e.g., a high speed spool. The fan rotor 31 is connected to and rotatably driven (e.g., only) by the cold turbine rotor 32 through another engine shaft 38; e.g., a low speed shaft. With this configuration, the turbine engine components 31, 32 and 38 are included in and form another engine spool 39; e.g., a low speed spool. This engine spool 39 circumscribes and may be substantially coaxial with the engine spool 37.

The engine shafts 36 and 38 and, thus, the engine spools 37 and 39 are rotatably supported by a plurality of bearings (not shown); e.g., rolling element and/or thrust bearings. Each of these bearings is connected to the engine housing 24 by at least one stationary structure such as, for example, an annular support strut.

The turbine engine 10 is configured with a plurality of airflow flowpaths 40-43 and the airflow manifold 44. These flowpaths include a bypass flowpath 40, an upstream core flowpath 41 and a plurality of downstream core flowpaths 42 and 43.

The bypass flowpath 40 is formed in an annulus radially between the inner housing structure 26 and the outer housing structure 28 and, thereby, bypasses a core portion of the turbine engine 10. The bypass flowpath 40 extends from the airflow inlet 14, through the fan section 19, to a nozzle 46 at (e.g., on, adjacent or proximate) the airflow exhaust 16.

The upstream core flowpath 41 is configured within the inner housing structure 26. The upstream core flowpath 41 extends from the airflow inlet 14, through the compressor section 18, to the manifold 44. The manifold 44 is fluidly coupled with and between the upstream core flowpath 41 and the downstream core flowpaths 42 and 43.

Figure 2:
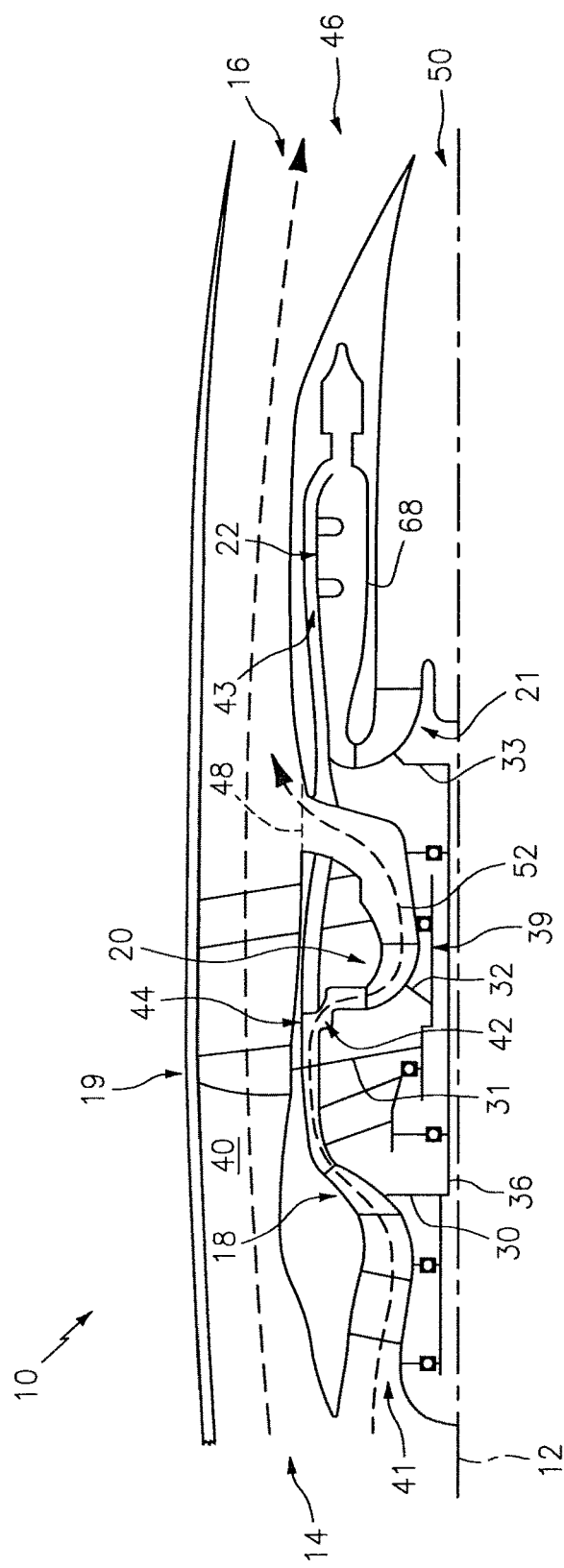
FIG. 2 is another partial side sectional schematic illustration of the gas turbine engine at a first circumferential position during operation.

Referring to FIG. 2, the first downstream core flowpath 42 is configured within the inner housing structure 26. The first downstream core flowpath 42 extends from the manifold 44, through the cold turbine section 20, to an outlet 48. This outlet 48 may be configured in the inner housing structure 26, and fluidly coupled with the bypass flowpath 40 between the fan section 19 and the airflow exhaust 16.

Figure 3:
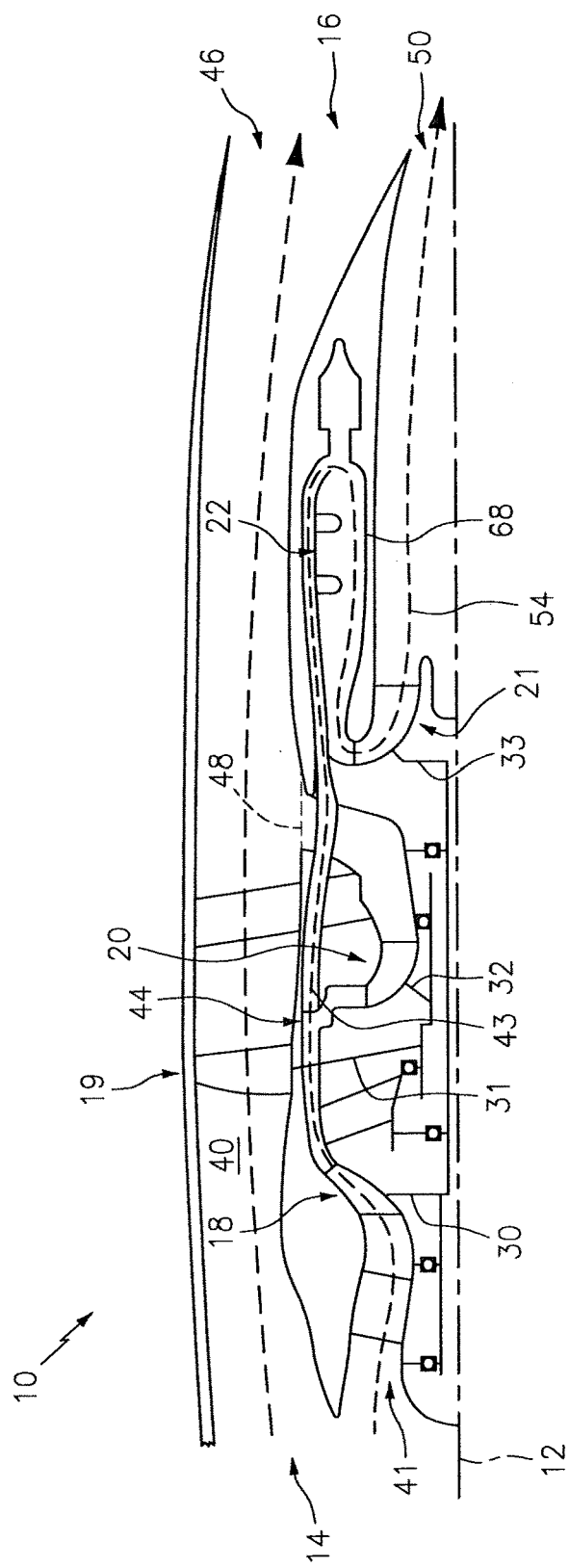
FIG. 3 is another partial side sectional schematic illustration of the gas turbine engine at a second circumferential position during operation.

Referring to FIG. 3, the second downstream core flowpath 43 is also configured within the inner housing structure 26. The second downstream core flowpath 43 extends from the manifold 44, sequentially through the combustor section 22 and the hot turbine section 21, to a nozzle 50 at (e.g., on, adjacent or proximate) the airflow exhaust 16.

Referring to FIGS. 2 and 3, as set forth above, the manifold 44 is fluidly coupled with and between the upstream core flowpath 41 and the downstream core flowpaths 42 and 43. The manifold 44 is configured to receive a compressed airflow from the upstream core flowpath 41 and split that received compressed airflow into at least a first airflow 52 (see FIG. 2) and a second airflow 54 (see FIG. 3). The manifold 44 is further configured to direct the first airflow 52 into the first downstream core flowpath 42 and direct the second airflow 54 into the second downstream core flowpath 43. The first airflow 52 may account for a first portion of the received compressed airflow. The second airflow 54 may account for a second portion of the received compressed airflow. The second portion may be greater than, less than or substantially equal the first portion depending upon the specific configuration and design requirements of the turbine engine 10.

Figure 4:
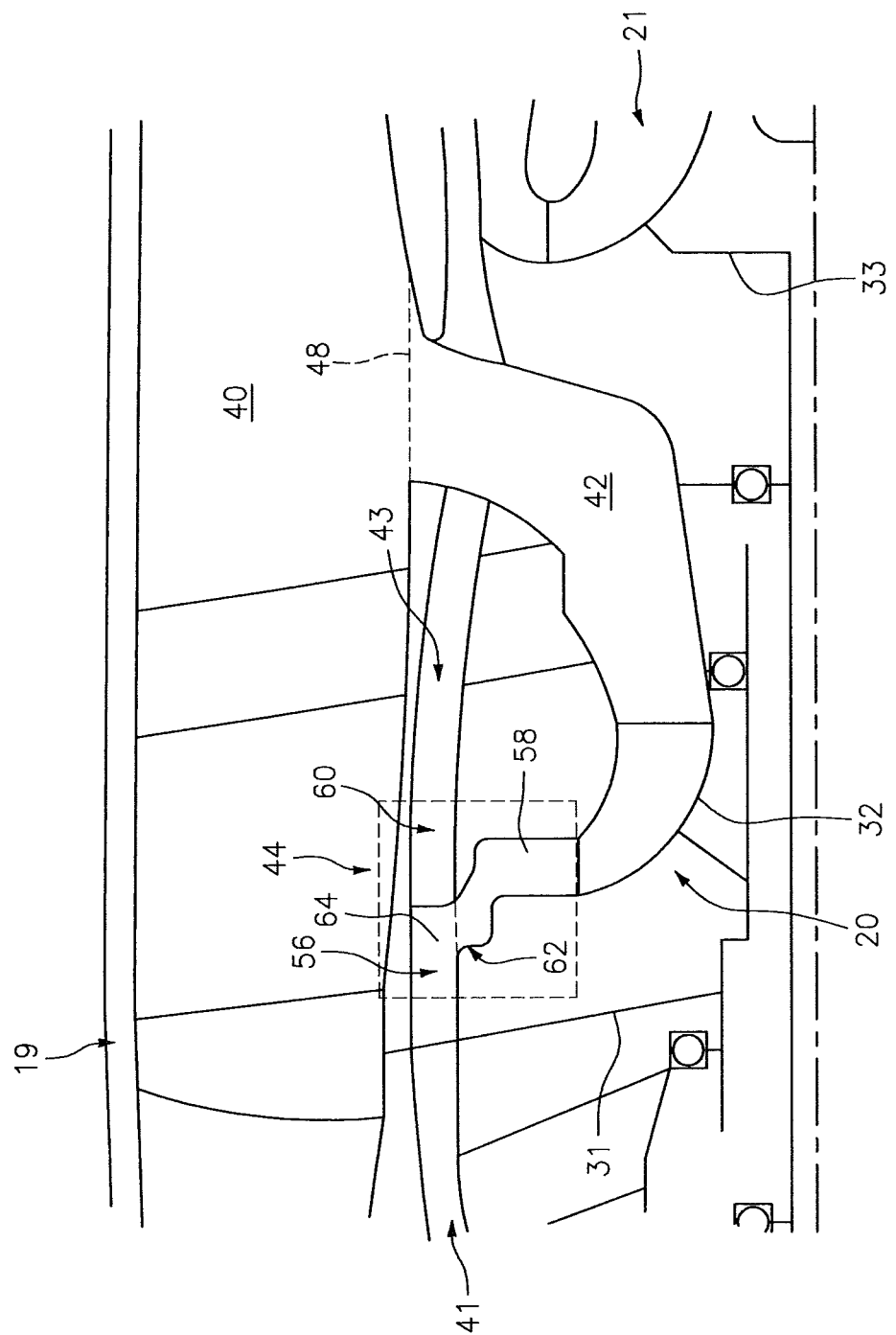
FIG. 4 is a partial side sectional schematic illustration of a mid-portion of the gas turbine engine.
Figure 5:
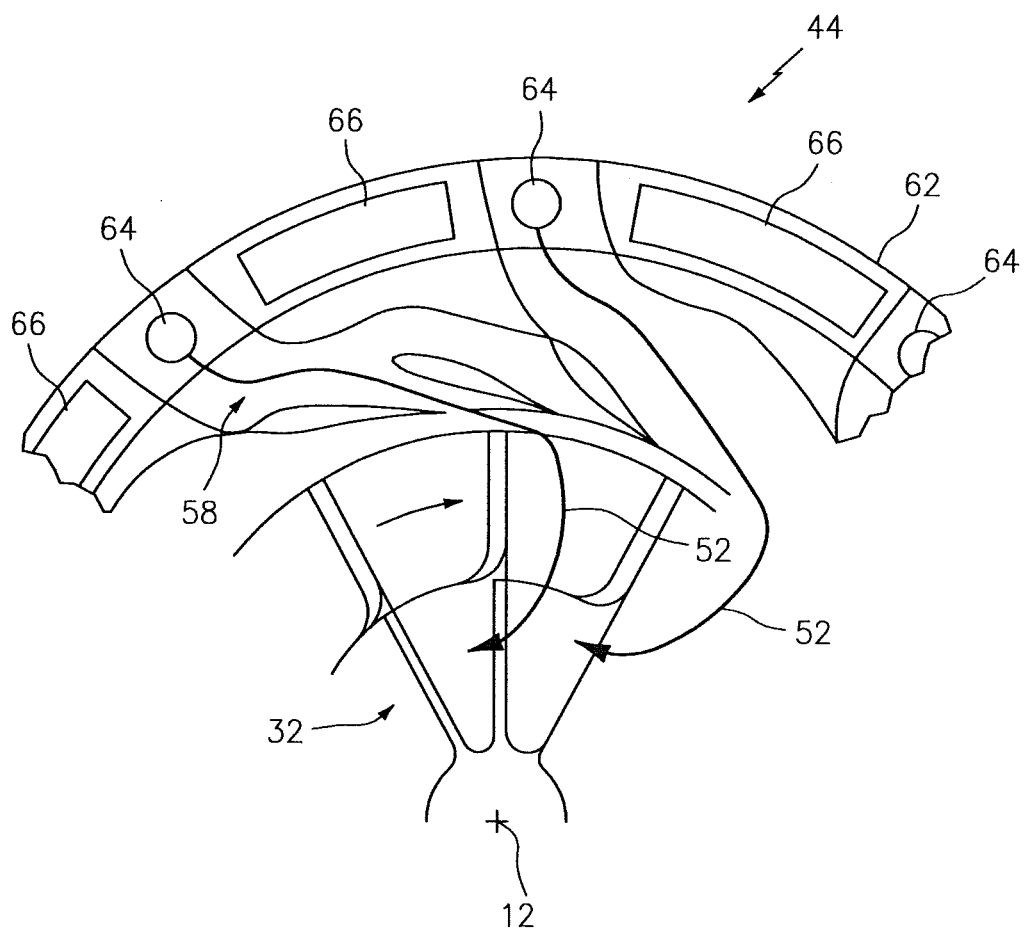
FIG. 5 is a partial cross-sectional schematic illustration of a mid-portion of the gas turbine engine.

Referring to FIG. 4, the manifold 44 includes an inlet passage 56 and a plurality of outlet passages 58 and 60. The inlet passage 56 extends from the upstream core flowpath 41 to a manifold structure 62; e.g., an airflow splitter. The manifold structure 62 of FIG. 5 is configured with an annular array of ports, which include one or more first ports 64 and one or more second ports 66. Each of the first ports 64 is located circumferentially between an adjacent pair of the second ports 66. Each of the second ports 66 is located circumferentially between an adjacent pair of the first ports 64. Referring again to FIG. 4, the first outlet passage 58, which may include one or more conduits/ducts, fluidly couples the first ports 64 with the first downstream core flowpath 42. The second outlet passage 60, which may include one or more conduits/ducts, fluidly couples the second ports 66 with the second downstream core flowpath 43.

The first outlet passage 58 is also configured as a cold turbine inlet passage. The first outlet passage 58, for example, is configured to direct the first airflow 52 to the cold turbine rotor 32. In the specific embodiment of FIGS. 2 and 4, the first outlet passage 58 is configured to direct the first airflow 52 to and into the cold turbine rotor 32 along a substantially radial inward trajectory. The second outlet passage 60 of FIGS. 3 and 4, in contrast, is configured to direct the second airflow 54 towards the combustor section 22 along a substantially axial (and aft) trajectory.

The manifold 44 may be formed as a monolithic body. Herein, the term "monolithic" may describe a component which is formed as a single unitary body. The manifold 44 and each of its components (e.g., 56, 58, 60 and 62), for example, may be additively manufactured, cast, machined and/or otherwise formed as a unitary body. This monolithic manifold 44 may have a full hoop body, which is formed without any mechanically interconnected axial and/or circumferential segments. The present disclosure, of course, is not limited to the foregoing exemplary monolithic manifold configuration.

Referring to FIGS. 2 and 3, during operation air enters the turbine engine 10 through the airflow inlet 14. A portion of this air is directed into the bypass flowpath 40 and to the fan section 19, which portion of air may be referred to as "bypass air". Another portion of the air is directed into the upstream core flowpath 41 and to the compressor section 18, which portion of air may be referred to as "core air".

The core air is compressed by the compressor rotor 30 and directed to the manifold 44. The manifold 44 directs a first portion of the received compressed core air to the first downstream core flowpath 42 as the first airflow 52. This first airflow 52 is directed to and flows through the cold turbine rotor 32, which causes the cold turbine rotor 32 to rotate. The rotation of the cold turbine rotor 32 drives rotation of the fan rotor 31, which propels the bypass air through and out of the bypass flowpath 40. After flowing through the cold turbine rotor 32, the first airflow 52 may be combined with the propelled bypass air to increase bypass air thrust. The combined bypass airflow and first airflow 52 may be exhausted from the turbine engine 10 through the nozzle 46 at the airflow exhaust 16.

The manifold 44 also directs a second portion of the received compressed core air to the second downstream core flowpath 43 as the second airflow 54. This second airflow 54 is directed into a combustion chamber of a combustor 68 (e.g., a reverse flow combustor) in the combustor section 22. Fuel is injected into the combustion chamber and mixed with the second airflow 54 to provide a fuel-air mixture. This fuel-air mixture is ignited and combustion products thereof flow through and cause the hot turbine rotor 33 to rotate. The rotation of the hot turbine rotor 33 drives rotation of the compressor rotor 30 and, thus, compression of the core airflow. After flowing through the hot turbine rotor 33, the second airflow 54 may be exhausted from the turbine engine 10 through the nozzle 50 at the airflow exhaust 16.

Figure 6:
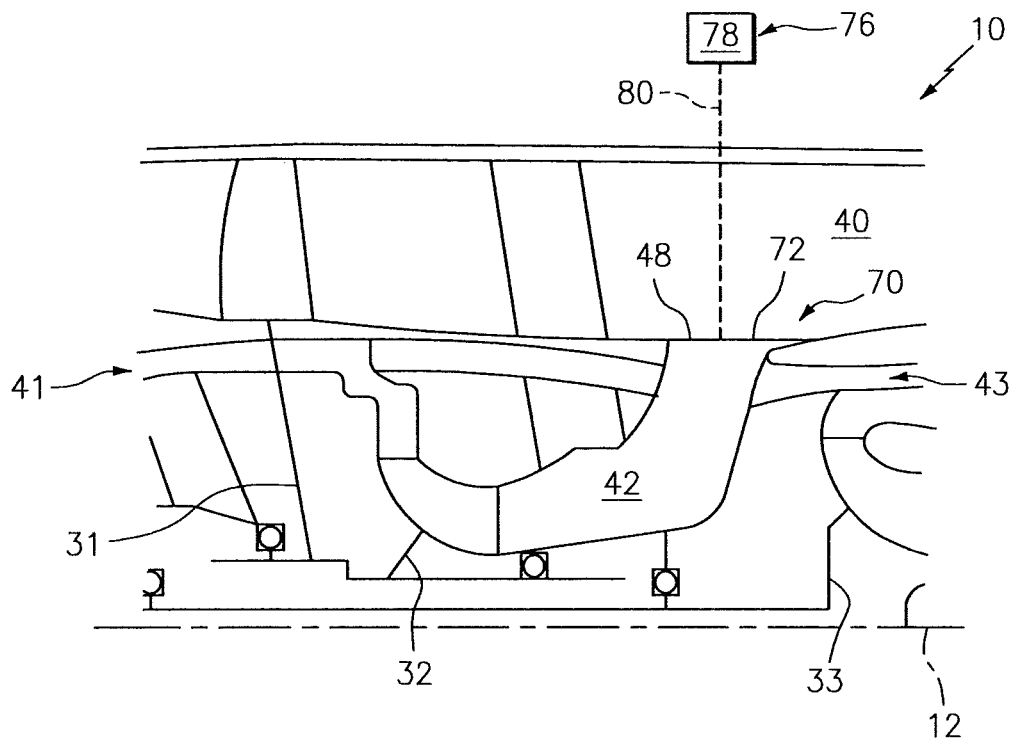
FIGS. 6 and 7 are partial side sectional schematic illustrations of a mid-portion of another multi-stream mixed turbofan gas turbine engine at different circumferential positions.
Figure 7:
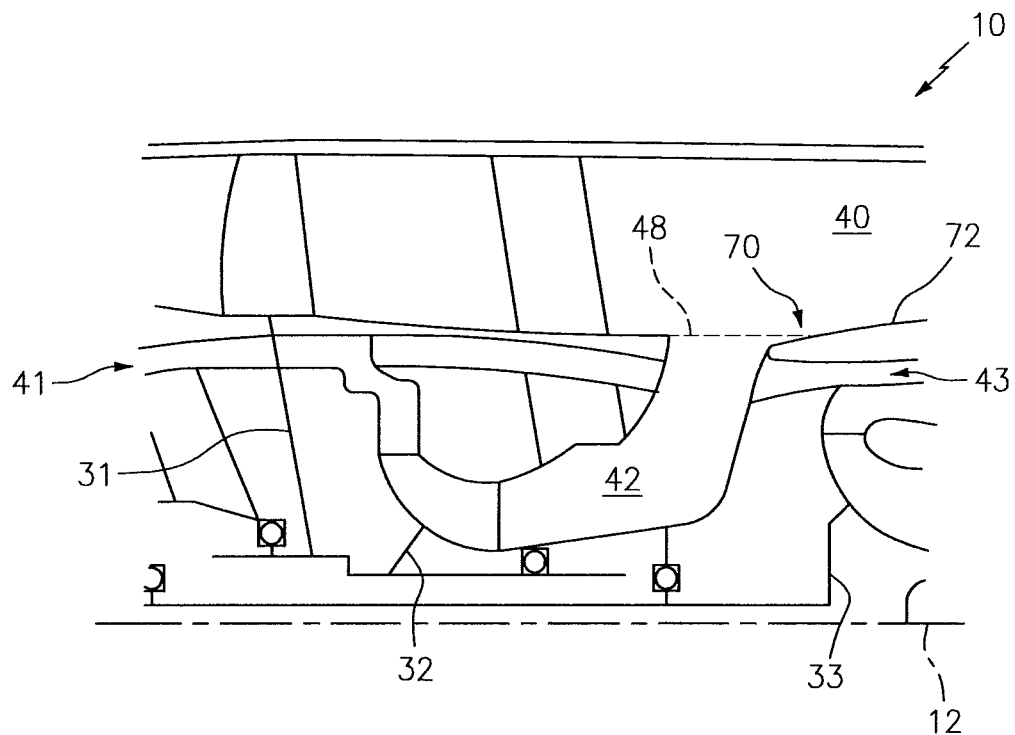

Referring to FIGS. 6 and 7, in some embodiments, the turbine engine 10 may include an airflow regulator 70 configured to regulate the first airflow 52 through the first downstream core flowpath 42. This regulator 70 may be configured downstream of the cold turbine rotor 32, for example, at (on, adjacent or proximate) the outlet 48. In the embodiment of FIGS. 6 and 7, the regulator 70 includes one or more doors 72 and is configured as a valve. Each of the doors 72 is configured to move (e.g., pivot or translate) from an open position (see FIG. 7) to a partially or completely closed position (see FIG. 6), which partially or completely closes the outlet 48. With such a configuration, the regulator 70 can control operation of the engine spool 39 (see FIG. 1). For example, to increase thrust produced by the fan section 19, the regulator 70 may move one or more of the doors 72 towards or to the open position (see FIG. 7). In contrast, to decrease thrust or substantially disable fan section 19 operation, the regulator 70 may move one or more of the doors 72 towards or to the closed position (see FIG. 6).

Referring again to FIG. 6, an airflow control system 76 of the engine 10 may facilitate the control of air flow through the first downstream core flowpath 42, and through the bypass flowpath 40, or any combination thereof. The control system 76 may include a controller 78 and one or more of the doors 72. The controller 78 may receive sensory input and/or operator input, processes the input(s), and output an electronic control signal 80 that operates the doors 72. It is contemplated and understood that the doors 72 may be any variety of valve-like structures including single-bodied units capable of both pathway isolation and variable flow control. It is further understood that the term 'valve' may include a plurality of blocker doors and/or aerodynamically shaped flaps that may be circumferentially distributed and operated by a common sync-ring as one, non-limiting, example.

The controller 78 may be, for example, part of a flight control computer, a portion of a Full Authority Digital Engine Control (FADEC), a stand-alone unit and/or other system. The control module may include a processor, a memory and an interface. The processor may be any type of microprocessor having desired performance characteristics. The memory may be any computer readable medium that stores data and control algorithms such as logic as described herein. More particularly, the memory is configured to store software (e.g., program instructions) for execution by the processor, which software execution may control and/or facilitate performance of one or more operations such as those described herein. The memory may be a non-transitory computer readable medium. The interface facilitates communication with other components such as a door actuator.

The systems and assemblies described above may be included in various aircraft and industrial turbine engines other than the one described above. The turbine engine 10, for example, may be configured as a geared or non-geared turbine engine. In another example, the turbine engine 10 may be configured with more than two spools. In still another example, the turbine engine 10 may include an additional compressor rotor driven by the cold turbine rotor 32. The present disclosure therefore is not limited to the exemplary turbine engine described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A gas turbine engine, comprising:
   a spool configured to rotate about an axial centerline, the spool comprising a fan rotor and a cold turbine rotor, and the fan rotor rotatably driven by the cold turbine rotor;
   a cold turbine inlet passage configured to direct an airflow along a radial inward trajectory to the cold turbine rotor;
   a second spool comprising a compressor rotor and a hot turbine rotor;
   a combustor fluidly between the compressor rotor and the hot turbine rotor;
   a first flowpath extending through the cold turbine rotor;
   a second flowpath extending through the combustor and the hot turbine rotor; and
   a manifold configured to receive a compressed airflow from the compressor rotor, to direct a portion of the compressed airflow into the first flowpath as the airflow, and to direct another portion of the compressed airflow into the second flowpath as a second airflow.

2. The gas turbine engine of claim 1, further comprising a cold turbine outlet passage, wherein the cold turbine rotor is configured to:
   receive the airflow from the cold turbine inlet passage along the radial inward trajectory; and
   direct the airflow into the cold turbine outlet passage along an axial trajectory.

3. The gas turbine engine of claim 1, further comprising an airflow regulator configured to regulate the airflow through the cold turbine rotor.

4. The gas turbine engine of claim 3, wherein the airflow regulator is configured downstream of the cold turbine rotor.

5. The gas turbine engine of claim 3, wherein the airflow regulator comprises a door.

6. The gas turbine engine of claim 1, wherein the manifold comprises the cold turbine inlet passage.

7. The gas turbine engine of claim 1, wherein the manifold comprises an annular array of ports including a plurality of first ports and a plurality of second ports, each of the first ports is located between an adjacent pair of the second ports, the first ports are fluidly coupled with the first flowpath, and the second ports are fluidly coupled with the second flowpath.

8. The gas turbine engine of claim 1, wherein the manifold is formed as a monolithic body.

9. The gas turbine engine of claim 1, wherein the manifold is additive manufactured.

10. The gas turbine engine of claim 1, wherein the combustor comprises a reverse flow combustor.

11. The gas turbine engine of claim 1, wherein the hot turbine rotor is configured to receive a second airflow along a radial inward trajectory, and to output the second airflow along an axial trajectory.

12. The gas turbine engine of claim 1, wherein the spool consists essentially of the fan rotor, the cold turbine rotor and a shaft connecting the fan rotor and the cold turbine rotor.

* * * * *